(12) United States Patent
Ruddy (10) Patent No.: US 7,770,857 B2
(45) Date of Patent: Aug. 10, 2010

(54) UNIVERSAL JOINT LOCK

(76) Inventor: Francis Ruddy, 1454 Ottawa Avenue, West Vancouver, B.C. (CA) V7T 2H6

( * ) Notice: Subject to any disclaimer, the term of this patent is extended or adjusted under 35 U.S.C. 154(b) by 1038 days.

(21) Appl. No.: 11/422,042

(22) Filed: Jun. 2, 2006

(65) Prior Publication Data

US 2007/0280779 A1 Dec. 6, 2007

(51) Int. Cl.
A47G 29/00 (2006.01)
(52) U.S. Cl. .................. 248/284.1; 248/125.9; 248/130
(58) Field of Classification Search .............. 248/130, 248/125.9, 187.1, 284.1, 133, 136, 150
See application file for complete search history.

(56) References Cited

U.S. PATENT DOCUMENTS

| | | | |
|---|---|---|---|
| 2,796,226 A * | 6/1957 | Dalton et al. ............. 248/183.2 |
| 3,562,851 A | 2/1971 | Koller | |
| 3,721,005 A | 3/1973 | Cohen | |
| 3,782,671 A | 1/1974 | Igwe | |
| 3,819,136 A | 6/1974 | Finke | |
| 3,841,769 A | 10/1974 | Bowerman | |
| 3,886,618 A | 6/1975 | Paoletti | |
| 4,023,891 A | 5/1977 | Chadwick | |
| 4,620,813 A | 11/1986 | Lacher | |
| 4,628,765 A | 12/1986 | Dien et al. | |
| 4,653,709 A | 3/1987 | Paldino | |
| 5,039,247 A | 8/1991 | Young | |
| 5,101,681 A | 4/1992 | Shpigel | |
| 5,517,205 A | 5/1996 | Van Heyningen et al. | |
| 5,560,256 A * | 10/1996 | Tines ........................ 74/490.1 |
| 5,609,565 A | 3/1997 | Nakamura | |
| 5,683,064 A | 11/1997 | Copeland et al. | |
| 5,853,153 A * | 12/1998 | Condrey ................... 248/125.2 |
| 6,026,703 A | 2/2000 | Stanisic et al. | |
| 6,068,223 A * | 5/2000 | Navarro .................... 248/187.1 |
| 6,170,965 B1 | 1/2001 | Kotovsky | |
| 6,264,152 B1 | 7/2001 | Bloch et al. | |
| 6,443,408 B1 * | 9/2002 | Hung ....................... 248/176.1 |
| 7,338,022 B2 * | 3/2008 | Hung ....................... 248/278.1 |
| D572,288 S * | 7/2008 | Neoh et al. ................. D16/208 |
| 7,461,826 B2 * | 12/2008 | Carnevali ................. 248/292.12 |
| 7,490,807 B2 * | 2/2009 | Souza et al. .............. 248/372.1 |
| 2005/0092873 A1 * | 5/2005 | Lin .......................... 248/125.9 |

FOREIGN PATENT DOCUMENTS

CA 1273666 9/1990

* cited by examiner

Primary Examiner—J. Allen Shriver, III
Assistant Examiner—Steven M Marsh
(74) Attorney, Agent, or Firm—Klarquist Sparkman, LLP (57) ABSTRACT

An apparatus for locking a universal joint is provide. The universal joint comprises first and second ends, a first member pivotally connected to said first end about a first axis, and a second member pivotally connected to the first member about a second axis wherein the first axis and the second axis are perpendicular to and intersect each other and wherein the second end is operably connected to the second member. The apparatus comprises a ring rotationally connected to the second pivotable member about a plane containing the second axis, a restraint for restraining the ring from rotation about the first axis, and a lock for locking the ring relative to the first member.

29 Claims, 6 Drawing Sheets

UNIVERSAL JOINT LOCK

BACKGROUND OF THE INVENTION

1. Field of Invention

This invention relates to locking universal joints, and more particularly, to an apparatus and method for locking two axes of rotation in a universal joint by the application of a single lock.

2. Description of Related Art

In the field of medicine or other industries, it is often necessary to hold an object such as a tool at a stationary location. Frequently, due to space constraints or other limitations it is not possible to affix the object to a large work surface. It is therefore necessary to use an arm or other similar type member to suspend the object. Such arms may have a single or a plurality of pivots so as to allow for the rotation of the arm about one or more axes relative to the base from which the arm projects.

While in use, it is frequently necessary to adjust or reposition the arm so as to reposition the object. Adjusting the angle of the arm may be accomplished by adjusting one or more of the axes of the arm relative to the base. A conventional method for accomplishing this readjustment is to provide an adjustable and lockable pivot for each of the axis of rotation of the joint. The user may then loosen the appropriate axis lock, adjust the angle of the arm about that axis and subsequently re-lock the axis.

A disadvantage of the conventional method as set out above is that the provision of multiple pivots for each axis of rotation for the joint often results in the axes of rotation of the joints being offset such that the axes do not intersect each other. This offset produces an arm that does not rotate about a single center point. A result of this offset is that the movement of the arm may be uneven or unpredictable as the rotation of the arm changes from one axis of rotation to another axis of rotation.

Another result of this offset is that some angular movements of the arm may result in binding of the joint. Such binding may occur when a first pivot is rotated to its maximum angle of rotation in one direction. After this point, further rotational forces are applied to the second pivot which may not allow for rotation in this direction. These rotational forces applied to the second pivot that are not in alignment with the axis of rotation of this second pivot may result in a loss of movement of this second pivot, wear or damage to the joint.

Another disadvantage of a dual-pivot type design as set out above is that a separate lock is required for each of the two pivots. Adjusting such a conventional joint therefore requires the user to first adjust the angle of the first pivot and subsequently to adjust the angle of the second pivot. Additionally, the user may be required to readjust the angle of the first pivot due to any misalignment caused in the first pivot due to the movement of the second pivot. This multiple step alignment process results in a time-consuming and potentially inaccurate alignment of the arm.

Another conventional method of providing for an adjustable joint is a ball and socket type joint. Such a ball and socket joint includes a spherical portion on the end of the arm which is received within a corresponding spherical receptacle on the surface to which the arm is to be attached. The receptacle may include an adjustable diameter so as to frictionally engage the spherical portion thereby fixing the angular position of the arm.

A disadvantage of the ball and socket type joint is the reliance on friction to engage the ball within the socket. Such reliance on friction requires that the clamping force applied to the ball by the socket be relatively large to ensure adequate locking of the joint. Furthermore, it will be appreciated by those skilled in the art that such a joint will continue to be susceptible to vibration, torque or acceleration forces applied to the arm and that such applied loads may cause the friction in the joint to fail.

A further disadvantage of the ball and socket type joint is that the socket is required to encompass at least a hemisphere of the ball. Preferably, the socket would extend past the centerline of the hemisphere so as to retain the ball within the socket. This will result in a joint of this type having a limited angle of rotation due to any projection from the ball being restricted to movement within the area of the ball not covered by the socket.

What would be desirable is a lockable universal joint that is capable of being locked into a user-selected alignment by the application of a single clamping force that securely and releasably retains the universal joint in the desired alignment.

SUMMARY OF THE INVENTION

To address the shortcomings of the prior art, the present invention is directed to a lockable universal joint that is capable of being locked into a user-selected alignment by the application of a single clamping force that securely and releasably retains the universal joint in the desired alignment.

In accordance with one aspect of the invention there is provided an apparatus for locking a universal joint. The universal joint comprises first and second ends, a first member pivotally connected to said first end about a first axis, and a second member pivotally connected to the first member about a second axis wherein the first axis and the second axis are perpendicular to and intersect each other wherein the second end is operably connected to the second member. The apparatus comprises a ring rotationally connected to the second pivotable member about a plane containing the second axis, a restraint for restraining the ring from rotation about the first axis, and a lock for locking the ring relative to the first member.

The lock may comprise a slidable body having first and second positions wherein in the first position the body is operable to enable the first member and the ring to freely rotate relative to each other and wherein in the second position the body is operable to releasably engage the first member and the ring so as to prevent rotation of the first member and the ring relative to each other. The slidable body may includes a first and second locking surface wherein the first locking surface is adapted to engage a first engagable surface of the first member and the second locking surface is adapted to engage a second engagable surface of the ring. The first and second locking surfaces may further include serrations adapted to engage corresponding serrations on the first member and the ring.

In accordance with another aspect of the invention there is provided an apparatus for locking a user positionable arm. The arm comprises a base, a first arm member, and a second arm member, a first universal joint between the base and the first arm member and a second universal joint between the first and second arm members, each of the first and second universal joints comprising first and second ends, a first member pivotally connected to the first end about a first axis, and a second member pivotally connected to the first member about a second axis wherein the first axis and the second axis are perpendicular to and intersect each other wherein the second end is operably connected to the second member. The apparatus comprises a first and second universal joint locking apparatus applied to the first and second universal joint respectively, wherein each of the first and second locking apparatuses comprises a ring rotationally connected to the second pivotable member about a plane containing the second axis, a restraint for restraining the ring from rotation about the first axis, and a lock for locking the ring relative to the first member, the apparatus further comprising an urging means for urging the locks of the first and second universal joint locking apparatuses.

In accordance with another aspect of the invention there is provided a method of locking a universal joint. The universal joint comprises first and second ends, a first member pivotally connected to the first end about a first axis, and a second member pivotally connected to the first member about a second axis wherein the first axis and the second axis are perpendicular to and intersect each other wherein the second end is operably connected to the second member. The method comprises locking the first member relative a ring rotationally connected to the second pivotable member about a plane containing the second axis wherein the ring is restrained from rotating about the first axis.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Aspects of the present invention are illustrated, merely by way of example, in the enclosed drawings in which.

DETAILED DESCRIPTION

Figure 1:
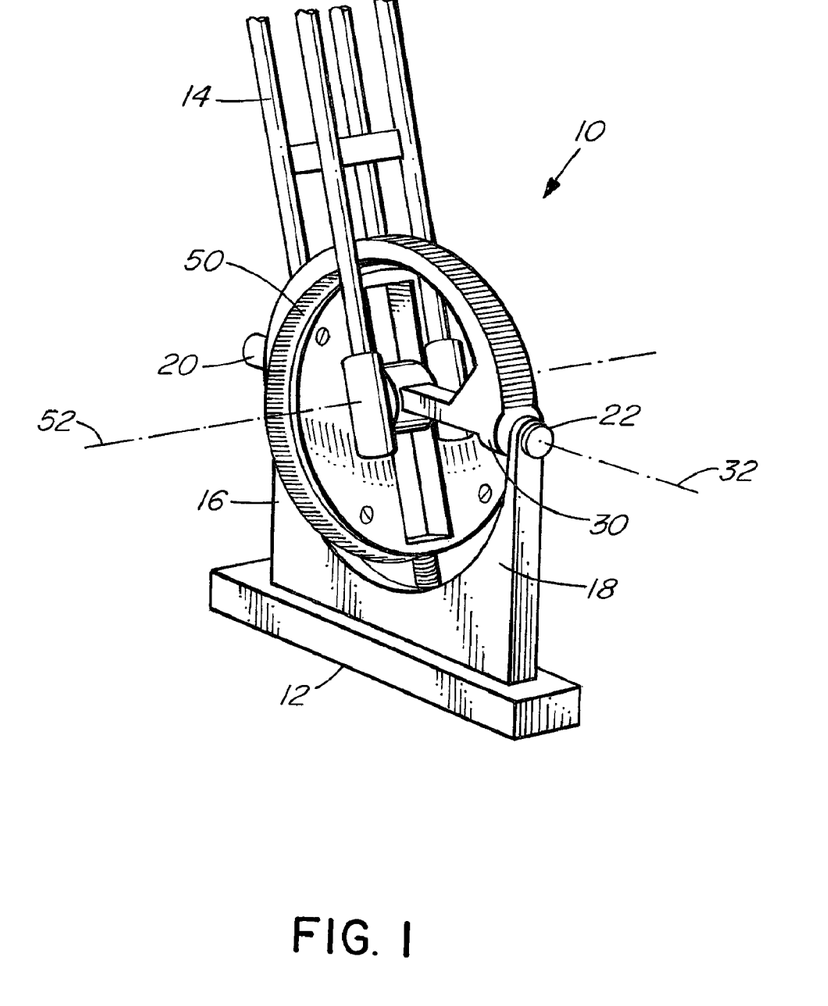
FIG. 1 is a perspective view of a universal joint according to a preferred embodiment of the present invention.

Referring to FIG. 1, a lockable universal joint according to the present invention is shown generally at 10. The universal joint permits the connection of two shafts or bodies as well as rotation of one of the shafts or bodies relative to the other about two axes of rotation. The universal joint lock of the present invention permits a user to releasably lock one of the shafts or bodies at one of a plurality of user selected angular alignments relative to the other shaft or body of the universal joint.

The universal joint 10 is formed with a first end 12 and a second end 14, and a first member 30 and a second member 50. The first member 30 is pivotally connected to the first end 12 about a first axis 32. The second member 50 is pivotally connected to the first member 30 about a second axis 52 which is perpendicular to and intersects first axis 32. The second member 50 is operably connected to the second end 14 of the universal joint.

The first end 12 of the universal joint includes a pair of spaced retaining arms 16 and 18. Retaining arm 16 is formed with a pivot 20 at its distal end. Similarly, retaining arm 18 is formed with a pivot 22 at its distal end. The pivots preferably comprise pins directed towards each other so as to engage corresponding bores in a body positioned therebetween. In a converse arrangement, pivots 20 and 22 may comprise bores operable to receive a pair of pins from a body held therebetween. It will be appreciated that other suitable pivoting arrangements will be apparent to those skilled in the art.

Figure 2:
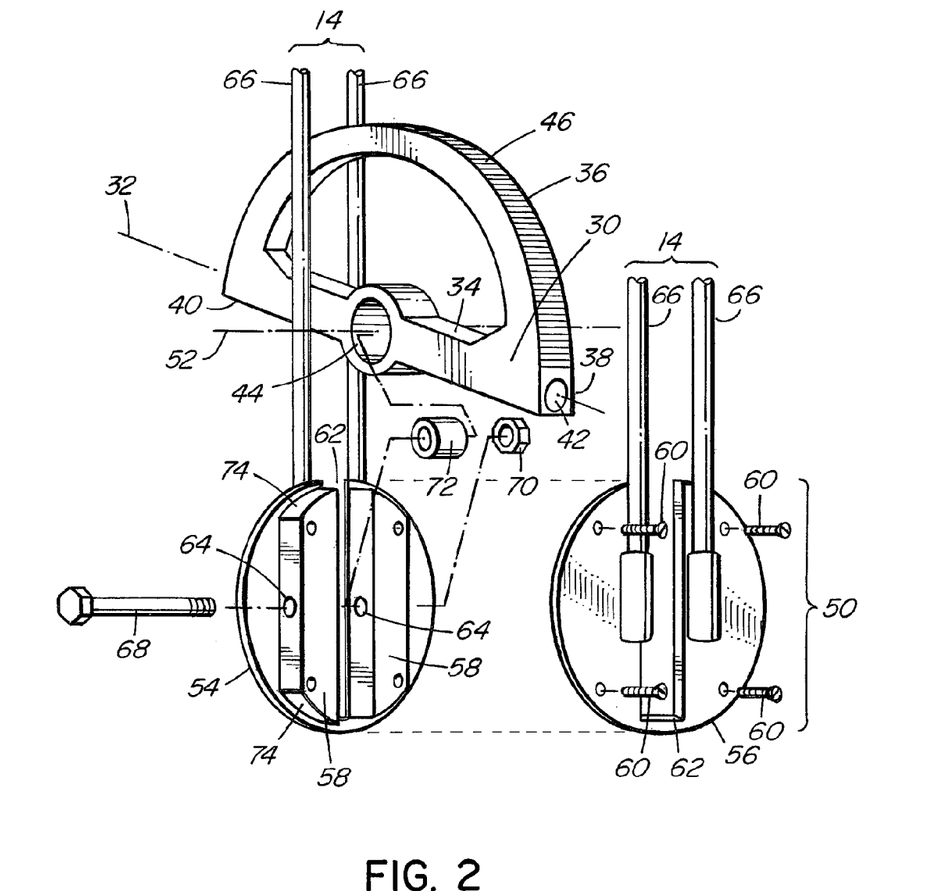
FIG. 2 is an exploded perspective view of the universal joint of FIG. 1.

Referring to FIG. 2, the first member 30 of the universal joint comprises an arm portion 34 and a ring portion 36. The arm portion 34 extends between first and second ends 38 and 40 along to define the first axis 32 of the universal joint. The first member may include first 42 and second (not shown) bores in the first and second ends 38 and 40 respectively, adapted to receive corresponding pins from the first end 12 of the universal joint. The first and second bores are coaxial with the first axis 32 of the universal joint so as to enable rotation about the first axis. Conversely, the first member 30 may include pins coaxial with the first axis and extending from said first and second ends so as to engage in corresponding bores in the first end 12 of the universal joint.

The first member 30 further includes a third bore 44 extending perpendicular to arm portion 34 and first axis 32. Third bore 44 is intermediate ends 38 and 40 of arm portion 34 and is formed to be coaxial with second axis 52 in the assembled universal joint.

The ring portion 36 of the first member 30 extends in a semi-circular arc between ends 40 and 42 of arm portion 34 and is formed on its outer peripheral edge with a first engagable surface 46. First engagable surface 46 is of semi-circular shape having a center that coincides with the center of third bore 44. First engagable surface 46 is adapted to allow for locking engagement with a corresponding surface. In a preferred embodiment of the invention, first engagable surface 46 includes a plurality of serrations for engagement with corresponding serrations or pins of a locking member. It will be understood by those skilled in the art that other surface treatments may be applied to the first engagable surface to assist locking engagement of the first engagable surface with a corresponding surface.

Second member 50 comprises first and second disc-shaped spaced rings 54 and 56 sandwiching a spacing block 58. The central spacing block 58 is mounted between first ring 54 and second ring 56 by retaining screws 60 or other similar fasteners. Each of the first and second rings and the central spacing block is formed with a slot 62 to receive first member 30 therein. Spacing block 58 further includes bores 64 extending transversely to slot 62 and parallel to the plane of the first and second rings. Referring to FIG. 2, spacing block 58 is preferably formed from a pair of spacing blocks separated by slot 62 and having aligned bores 64 through each block 58.

The first and second rings 54, 56 are attached to the second end 14 of the universal joint 10. In one embodiment of the invention, the second end of the universal joint comprises a set of four parallel rods 66 located adjacent slots 62 on each side of first and second rings 54 and 56. When the second ring is fastened to spacing block 58, the four rods 66 are brought into close proximity and may be fastened together at a distal end of the rods so as to form a single member (not shown) of the universal joint.

The second member 50 may be attached to the first member 30 by locating the slots 62 of the first and second rings 54 and 56 and the spacing block 58 over the first member such that third bore 44 in the first member is aligned with bores 64 in the spacing block 58. A retaining bolt 68 is passed through aligned bores 44 and 64 to receive a retaining nut 70. A further bearing sleeve 72 may be located within third bore 44 in the first member 30 to permit smooth rotation of second member 50 and attached rods 66 about axis 52 while permitting independent rotation of first member 30 about transverse axis 32.

Figure 3:
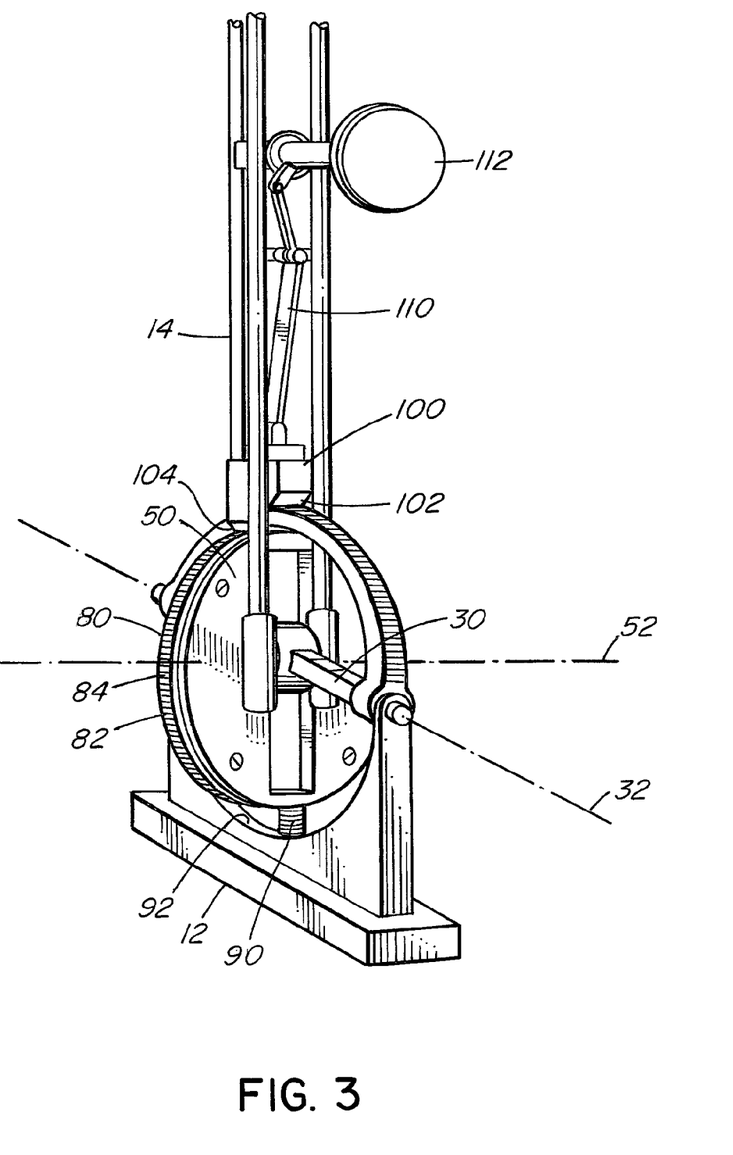
FIG. 3 is an additional perspective view of the universal joint of FIG. 1 including the locking block.

Referring to FIG. 3, a universal joint lock for the above described universal joint is shown. The universal joint lock comprises a locking ring 80, a restraint 90, and a locking block 100. Locking ring 80 is fitted over the spacing block 58 of the second member 50 between the first and second rings 54 and 56. The locking ring includes an inner surface (not shown) and an outer second engagable surface 82. Outer second engagable surface 82 is preferably formed with teeth or serrations 84 so as to releasably engage corresponding serrations or pins. As shown in FIG. 2, spacing block 58 includes a rounded outer surface 74 which has a radius about first axis 32. The inner surface of locking ring 80 has a circular shape adapted to slidably engage outer surface 74 of spacing block 58 so as to permit rotation of the locking ring relative to the spacing block.

As shown in FIG. 3, the restraint according to a preferred embodiment of the invention comprises a pin 90 projecting radially outwardly from ring 80 to engage within a corresponding arcuate slot 92 formed adjacent first end 12 of the universal joint. Slot 92 and first axis 32 form a common plane. Slot 92 has a radius that intersects the first axis 32 and the second axis 52, and slot 92 extends between the first and second spaced retaining arms 16 and 18 of the first end 12 of the universal joint.

Still referring to FIG. 3, locking block 100 according to a preferred embodiment of the invention comprises a slidable block. The locking block includes first and second locking surfaces 102 and 104, respectively. The first and second locking surfaces are adapted to releasably engage the first engagable surface 46 of the first member 30 and the second engagable surface 82 of the locking ring 80, respectively. Locking block 100 is slidable between first and second positions. In the first position, the first and second locking surfaces are out of contact with first and second engagable surfaces 46 and 82. In the second position shown in FIG. 3, the first and second locking surfaces are brought into contact with the first and second engagable surfaces.

Figure 4:
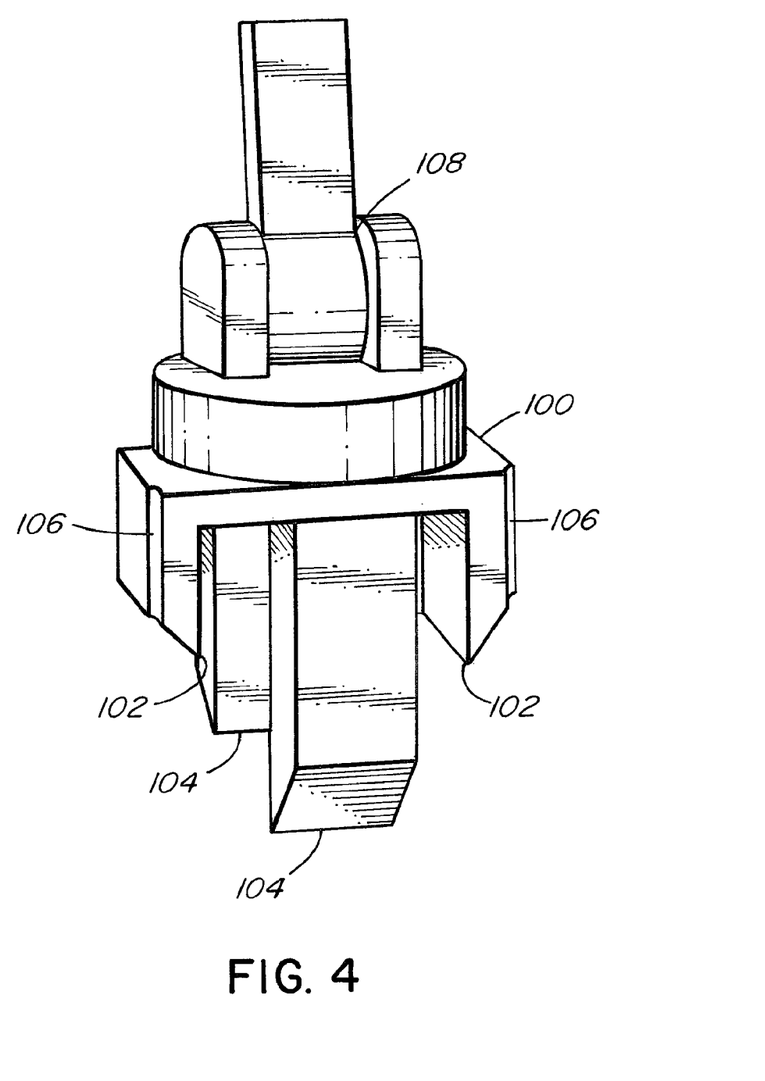
FIG. 4 is a detail perspective view of the locking block shown in FIG. 3.

Referring now to FIG. 4, locking block 100 is shown in detail according to a preferred embodiment. The locking block has a height, a locking end and an actuating end. As shown in FIG. 4, locking block 100 includes at the locking end a plurality of first locking surfaces 102 and a plurality of second locking surfaces 104. The locking block according to one embodiment of the present invention may also include radiused guides 106 recessed longitudinally into the locking block to accommodate the rods 66 of the second end 14 of the universal joint. The radiused guides may serve to locate and guide the path of the locking block between the first and second positions between the rods 66. Locking block 100 may also include a connector 108 at the actuating end to enable the locking block to be connected to an actuator.

As shown in FIG. 3, in the preferred embodiment, the universal joint lock further includes a linkage 110 for moving the locking block from the first position to the second position, thereby engaging the first and second locking surfaces 102 and 104 upon respective first and second engagable surfaces 46 and 82. The universal joint lock may further include a crank arm 112 which operates the linkage 110. It will be appreciated by those skilled in the art that other arrangements for moving the locking block between the first and second positions may accomplish the same function as the linkage and crank arm described above without altering the operation of the invention.

Figure 5:
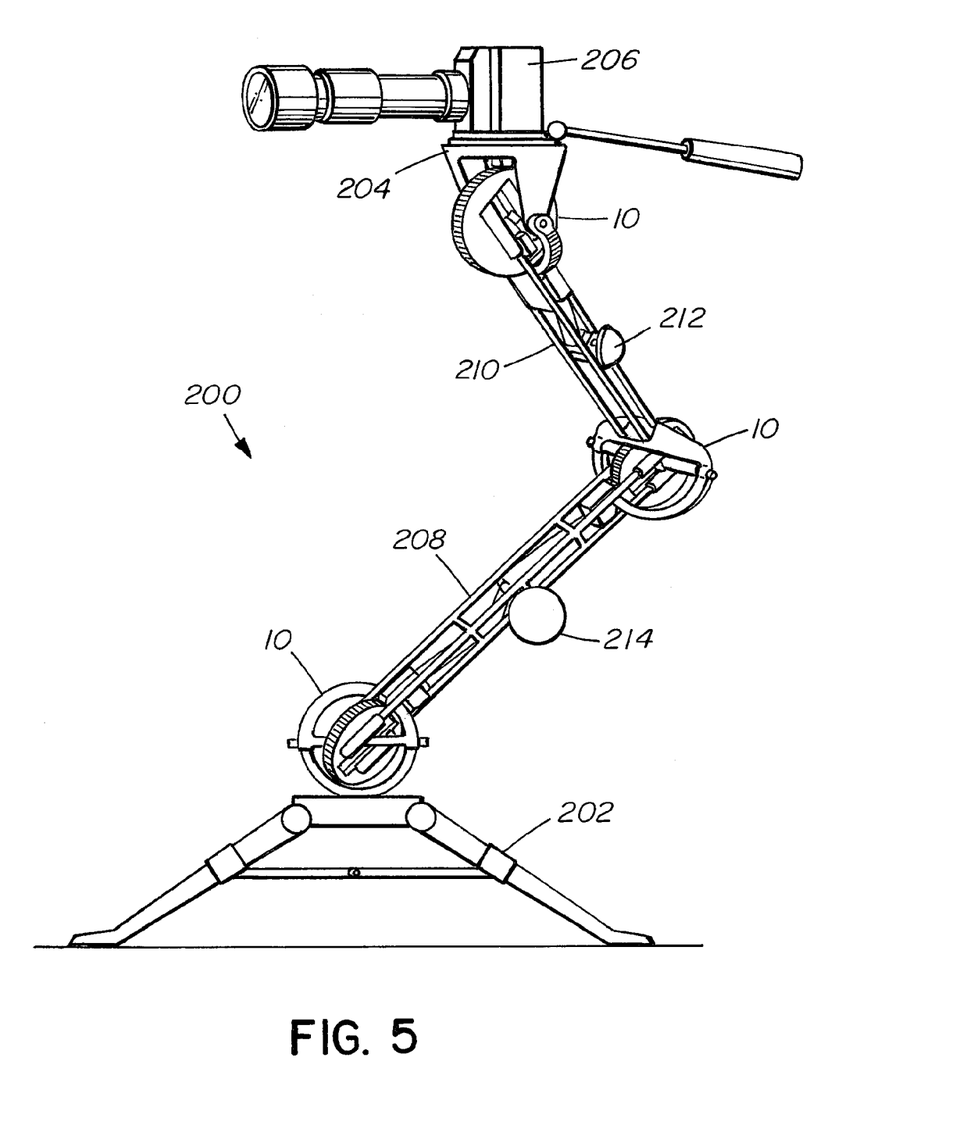
FIG. 5 is a perspective view of the user positionable arm according to the present invention.

Now referring to FIG. 5, an arm according to another embodiment of the present invention is shown generally at 200. The arm 200 includes a base 202 and a mounting base 204 wherein the mounting base may be adapted to position a camera 206 or other similar object. The arm may include a first and second arm members 208 and 210, respectively. The arm may further include universal joints 10 and universal joint locks between each of the base 202 and the first arm member 208, the first arm member 208 and the second arm member 210, and the second arm member 210 and the mounting base 204. Arm 200 may include a single crank 212 in one of the arm members (arm member 210 in FIG. 5) for operating the locking block in one end of the arm member. Arm 200 may also include a double crank 214 in one of the arm members (arm member 208 in FIG. 5) for simultaneously operating the locking blocks at opposing ends of the arm member.

It will be appreciated that although as shown in FIG. 5, three locking universal joints are included in the arm, more than three universal joints may be used. In addition, as more universal joints are applied to an arm, it will be appreciated that the end of the arm be able to be located and oriented at a greater number of possible positions and orientations.

Operation

Figure 6:
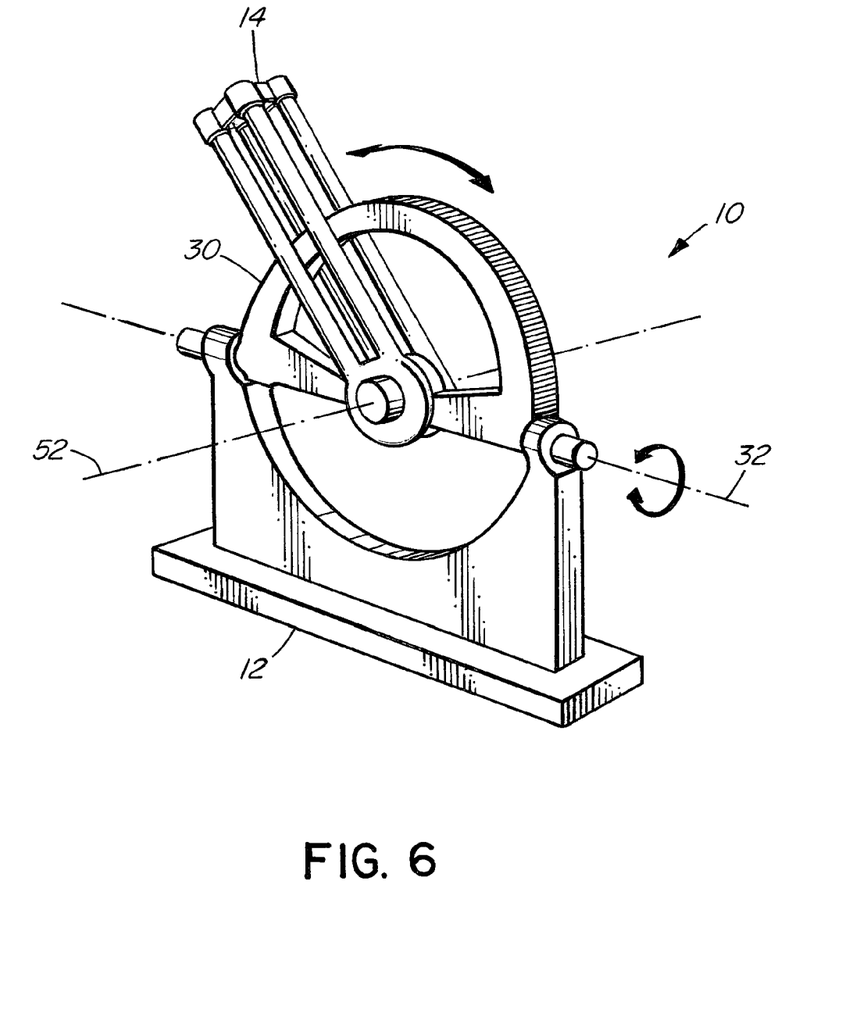
FIG. 6 is a perspective view of the universal joint showing movement of the second end.

As shown in FIG. 6, universal joint 10 permits rotation of the second end 14 about the first and second axes 32 and 52 relative to the first end 12. It will be observed from FIG. 6, that the orientation of the first axis 32 is fixed relative to the first end 12. It will further be observed that the orientation of the second axis 52 is fixed relative to the first member 30. The orientation of the second axis is not fixed relative to the first end 12, but rather the orientation of the second axis relative to the first end 12 will be varied according to the orientation of the first member 30. It will further be observed that due to the second axis 52 being fixed relative to the first member 30, that the first and second axes will remain orthogonal to each other throughout the entire movement of the second end 14 of the universal joint relative to the first end 12 of the universal join. It will further be observed that due to the first and second axes intersecting each other, the second end 14 of the universal joint will be pivotable about a single point relative to the first end 12. The single pivot point of the universal joint is be the intersection of the first and second axes 32 and 52 respectively.

Referring to FIG. 1, the second member 50 is pivotally connected to the first member 30 about the second axis 52 and the second end 14 of the universal joint is connected to the second member. The second end 14 of the universal joint is therefore free to rotate about the second axis 52 by rotating the second member relative to the first member about the second axis. The second member 50 is maintained in a plane that is orthogonal to the second end 14 by the connection of the four rods 66 of the second end to the second member. Locking ring 80 is similarly maintained in a plane that is orthogonal to the second end 14 of the universal joint by virtue of the locking ring being retained between the first and second rings 54 and 56 of second member 50.

It will be observed from the foregoing that rotation of the second end 14 relative to the first end 12 of the universal joint is accomplished rotating the second end relative to the first end about a combination of the first and second axes. First member 30 is permitted to rotate relative to the first end 12 of the universal joint about the first axis 32 only. Second member 50, and therefore the second end 14 of the universal joint, are permitted to rotate about first member 30 about the second axis 52 only.

Referring to FIG. 3, locking ring 80 is mounted about the periphery of second member 50 to permit rotation of the locking ring relative to the second member 50. As shown in FIG. 3, pin 90 of the universal joint lock engages in corresponding arcuate slot 92 in the first end of the universal joint. Slot 92 prevents movement of the pin lateral to the slot but permits movement of the pin through the arc of the slot. Because pin 90 is rigidly affixed to the locking ring 80, the locking ring is correspondingly constrained from rotation about the first axis 32 by the slot 92. While locking ring 80 is restrained from rotation about the first axis 32, second member 50 remains free to rotate about the first axis 32. In addition, due to the connection of the second end 14 to the second member 50, the second end of the universal joint remains free to rotate about the first and second axes 32 and 52 relative to the first end 12 of the universal joint.

Locking block 100, in the second position, always engages the first and second locking surfaces 102 and 104 with the first and second engagable surfaces 46 and 82, respectively. The engagement of the both locking surfaces of the locking block with both engagable surfaces fixes and prevents any further rotation of the first member relative to the locking ring. Locking ring 80 is prevented from rotation about 52 second axis relative to first member 30, and the first member is correspondingly prevented from rotation relative to the locking ring about the first axis 32. Due to the locking ring being prevented from rotation about first axis 32 by pin 90, the first member 30 is therefore correspondingly prevented from rotation about the first axis 32 as well. In this position, the second end 14 of the universal joint is prevented from rotation about either the first or second axis and the universal joint is locked.

While specific embodiments of the invention have been described and illustrated, such embodiments should be considered illustrative of the invention only and not as limiting the invention as construed in accordance with the accompanying claims.

What is claimed is:

1. A lockable universal joint apparatus, the apparatus comprising:
   a first end having a first member pivotally connected thereto about a first axis;
   a second end having a second member operably connected thereto, said second member pivotally connected to said first member about a second axis, wherein said first axis and said second axis are perpendicular to and intersect each other;
   a ring rotationally connected to said second member about a plane containing said second axis;
   a restraint for restraining said ring from rotation about said first axis; and
   a lock for locking said ring relative to said first member, wherein said lock comprises a slidable body movable between first and second positions, wherein in said first position said slidable body permits said first member and said ring to freely rotate relative to each other, and wherein in said second position said slidable body releasably engages said first member and said ring to prevent rotation of said first member and said ring relative to each other.

2. The apparatus of claim 1 wherein said slidable body includes first and second locking surfaces, and wherein said first locking surface is adapted to engage said first member and said second locking surface is adapted to engage said ring.

3. The apparatus of claim 2 wherein said first member further includes a first engagable surface.

4. The apparatus of claim 3 wherein said first engagable surface is substantially arcuate.

5. The apparatus of claim 4 wherein said first locking surface includes serrations adapted to engage corresponding serrations on said first member.

6. The apparatus of claim 2 wherein said ring includes a second engagable surface.

7. The apparatus of claim 6 wherein said second engagable surface is substantially circular.

8. The apparatus of claim 7 wherein said second locking surface includes serrations adapted to engage corresponding serrations on said ring.

9. The apparatus of claim 2 further including urging means for urging said slidable body into said second position.

10. The apparatus of claim 9 wherein said urging means includes a threaded rod in communication with said slidable body and a corresponding threaded portion of said second end of said universal joint such that turning of the threaded rod causes the slidable body to be urged into said second position.

11. The apparatus of claim 9 wherein said urging means includes a linkage arm.

12. The apparatus of claim 11 wherein said linkage arm includes first and second ends and a pivot point disposed between said first and second ends wherein said first end is in communication with said slidable body and said second end is operated by a user.

13. The apparatus of claim 1 wherein said restraint includes a pin radially projecting from said ring which engages within a corresponding slot within said first end of said universal joint such that said slot and said first axis define a common plane.

14. The apparatus of claim 13 wherein said slot has a substantially concave shape and a radius of curvature about a point of intersection between said first and second axis.

15. A user positionable arm apparatus, the apparatus comprising:
   a base;
   a first arm member;
   a second arm member;
   a first lockable universal joint between said base and said first arm member; and
   a second lockable universal joint between said first and second arm members, wherein each of said first and second lockable universal joints include:
   a first end having a first member pivotally connected thereto about a first axis;
   a second end having a second member operably connected thereto, said second member pivotally connected to said first member about a second axis, wherein said first axis and said second axis are perpendicular to and intersect each other;
   a ring rotationally connected to said second pivotable member about a plane containing said second axis;
   a restraint for restraining said ring from rotation about said first axis;
   a lock for locking said ring relative to said first member; and
   urging means for urging said lock.

16. The apparatus of claim 15 wherein said lock comprises a slidable body having first and second positions wherein in said first position said body is operable to enable said first member and said ring to freely rotate relative to each other and wherein in said second position said body is operable to releasably engage said first member and said ring so as to prevent rotation of said first member and said ring relative to each other.

17. The apparatus of claim 16 wherein said slidable body includes first and second locking surfaces, and wherein said first locking surface is adapted to engage said first member and said second locking surface is adapted to engage said ring.

18. The apparatus of claim 17 wherein said first member further includes a first engagable surface.

19. The apparatus of claim 18 wherein said first engagable surface is substantially arcuate.

20. The apparatus of claim 19 wherein said first locking surface includes serrations adapted to engage corresponding serrations on said first member.

21. The apparatus of claim 17 wherein said locking ring includes a second engagable surface.

22. The apparatus of claim 21 wherein said second engagable surface is substantially circular.

23. The apparatus of claim 22 wherein said second locking surface includes serrations adapted to engage corresponding serrations on said ring.

24. The apparatus of claim 16 wherein said urging means bears upon said lock so as to urge said lock into said second position.

25. The apparatus of claim 24 wherein said urging means comprises first and second linkage arms and an actuator, wherein each of said first and second linkage arms include first and second ends and a pivot point disposed between said first and second ends, and wherein said first end is in communication with said slidable body and said second end is actuated by said actuator.

26. The apparatus of claim 25 wherein said actuator comprises a user rotatable crank arm.

27. The apparatus of claim 15 wherein said restraint includes a pin radially projecting from said ring which engages within a corresponding slot within said first end of said universal joint, and wherein said slot is on a plane which includes said first axis.

28. The apparatus of claim 27 wherein said slot has a substantially concave shape and a radius of curvature about a point of intersection between said first and second axis.

29. A method of locking a first end of a lockable universal joint relative a second end of the lockable universal joint, the method comprising:
   restricting movement of a first member pivotally connected to said first end about a first axis;
   restricting movement of a ring rotationally connected to a second member, wherein said second member is operably connected to said second end and is pivotally connected to said first member about a second axis, wherein said first axis and said second axis are perpendicular to and intersect each other, wherein said ring is rotationally connected to said second member about a plane containing said second axis and said ring is restrained from rotating about said first axis; and
   wherein restricting movement of said first member and restricting movement of said ring includes:
      causing a slidable body to be moved from a first unlocked position to a second locked position,
      wherein in said first unlocked position said slidable body permits said first member and said ring to freely rotate relative to each other, and
      wherein in said second locked position said slidable body releasably engages said first member and said ring to prevent rotation of said first member and said ring relative to each other.

* * * * *